(12) United States Patent
Kushida

(10) Patent No.: US 7,663,669 B2
(45) Date of Patent: Feb. 16, 2010

(54) IMAGING APPARATUS INCLUDING AN XY-ADDRESS-SCANNING IMAGING DEVICE, IMAGING METHOD, AND RECORDING MEDIUM

(75) Inventor: Hidenori Kushida, Tokyo (JP)

(73) Assignee: Sony Corporation, Tokyo (JP)

( * ) Notice: Subject to any disclaimer, the term of this patent is extended or adjusted under 35 U.S.C. 154(b) by 526 days.

(21) Appl. No.: 11/609,481

(22) Filed: Dec. 12, 2006

(65) Prior Publication Data

US 2008/0018751 A1    Jan. 24, 2008

(30) Foreign Application Priority Data

Dec. 27, 2005    (JP) .............................. 2005-374957

(51) Int. Cl.
*H04N 9/73*    (2006.01)
(52) U.S. Cl. ................................. 348/228.1; 348/226.1
(58) Field of Classification Search .............. 348/226.1, 348/228.1
See application file for complete search history.

(56) References Cited

U.S. PATENT DOCUMENTS

| 7,280,135 | B2 * | 10/2007 | Kim ......................... 348/228.1 |
| 7,289,144 | B2 * | 10/2007 | Arazaki .................... 348/228.1 |
| 7,298,401 | B2 * | 11/2007 | Baer ........................ 348/226.1 |
| 2005/0093996 | A1 * | 5/2005 | Kinoshita ................. 348/226.1 |
| 2006/0055823 | A1 * | 3/2006 | Kinoshita et al. ........... 348/511 |
| 2006/0284992 | A1 * | 12/2006 | Kinoshita ................. 348/226.1 |
| 2007/0013785 | A1 * | 1/2007 | Kinoshita et al. ......... 348/222.1 |
| 2007/0153094 | A1 * | 7/2007 | Noyes et al. .............. 348/226.1 |
| 2008/0018751 | A1 * | 1/2008 | Kushida ................... 348/226.1 |

FOREIGN PATENT DOCUMENTS

| EP | 1 324 598 A2 | 7/2003 |
| EP | 1 566 962 A1 | 8/2005 |
| JP | 2000172107 A * | 6/2000 |
| JP | 2004-222228 | 8/2004 |
| WO | WO 99/56455 | 11/1999 |

* cited by examiner

*Primary Examiner*—John M Villecco
(74) *Attorney, Agent, or Firm*—Oblon, Spivak, McClelland, Maier & Neustadt, L.L.P.

(57) ABSTRACT

An imaging apparatus includes an integrating unit to integrate pixel values of pixels in each of a plurality of areas of an image; a holding unit to hold integration values generated by the integrating unit; an operating unit to operate a waveform of a differential value between integration values of the same areas in two images having a phase difference of flicker of 180 degrees; an extracting unit to extract phase and amplitude of the flicker on the basis of the waveform operated by the operating unit; a selecting unit to select a waveform of the flicker on the basis of shutter speed of the imaging apparatus; and a correcting unit configured to correct the pixel values of the pixels by using a correction value based on the flicker waveform selected by the selecting unit and the phase and amplitude extracted by the extracting unit.

10 Claims, 15 Drawing Sheets

FIG. 3
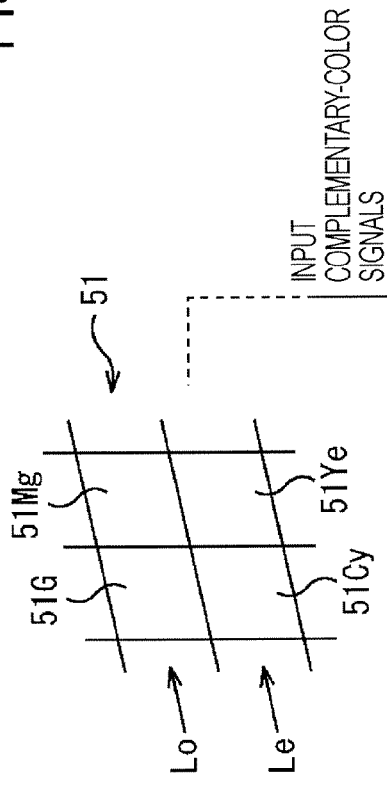
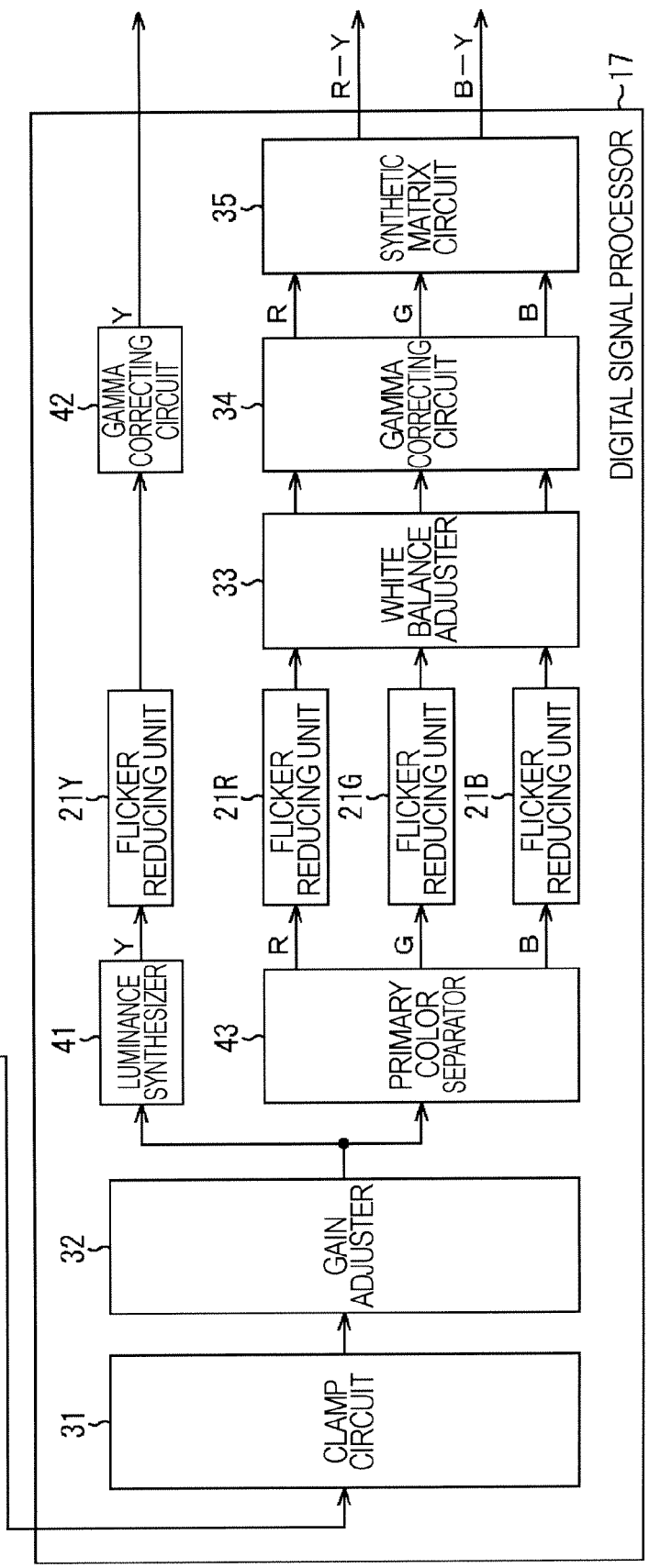

US 7,663,669 B2

IMAGING APPARATUS INCLUDING AN XY-ADDRESS-SCANNING IMAGING DEVICE, IMAGING METHOD, AND RECORDING MEDIUM

CROSS REFERENCES TO RELATED APPLICATIONS

The present invention contains subject matter related to Japanese Patent Application JP 2005-374957 filed in the Japanese Patent Office on Dec. 27, 2005, the entire contents of which are incorporated herein by reference.

BACKGROUND OF THE INVENTION

1. Field of the Invention

The present invention relates to an imaging apparatus, an imaging method, a recording medium, and a program. Particularly, the present invention relates to an imaging apparatus, an imaging method, a recording medium, and a program capable of reducing flicker that occurs during imaging performed by a video camera using an XY-address-scanning imaging device under a fluorescent-lighted environment.

2. Description of the Related Art

As is conventionally known, flicker occurs due to fluorescent light during imaging of moving images performed by a video camera under a fluorescent-lighted environment.

More specifically, when images of a subject are taken by a video camera under a fluorescent-lighted environment that is directly generated by a commercial AC power supply, a difference between a frequency of a change in luminance (light intensity) of fluorescent light (twice the frequency of the commercial AC power supply) and a vertical synchronization frequency of the camera causes a temporal change in contrast in output video signals, that is, so-called flicker (fluorescent flicker).

For example, assume that images of a subject are taken by a CCD (charge-coupled device) camera of an NTSC (National Television System Committee) method (the vertical synchronization frequency is 60 Hz) under non-inverter fluorescent light in an area using a commercial AC power supply frequency of 50 Hz. In that case, one field period is $1/60$ seconds, whereas a period of change in luminance of the fluorescent light is $1/100$ seconds. Accordingly, exposure timing is different in each field with respect to a change in luminance of the fluorescent light, so that the amount of exposure of each pixel changes in each field.

Under these circumstances, flicker-combating imaging apparatuses have been proposed.

For example, a video camera preventing occurrence of flicker by using exposure time has been proposed. Also, regarding a video camera using an XY-address-scanning imaging device, a technique of correcting occurrence of flicker by using a prepared pattern of change in luminance and hue has been proposed. Also, a technique of reducing an effect of flicker by using frames having a phase difference of 180 degrees has been proposed.

Also, Patent Document 1 (Japanese Unexamined Patent Application Publication No. 2004-222228 discloses the following technique. That is, an input image signal is integrated over time of one horizontal period or more, a differential value of integration values in adjacent fields is normalized by an average of integration values in three sequential fields, discrete Fourier transform is performed on the normalized differential value so that a spectrum is extracted, a flicker coefficient is estimated on the basis of the extracted spectrum, whereby an effect of flicker in the input image signal is reduced.

SUMMARY OF THE INVENTION

However, when exposure time is used, the following problem arises. For example, in a camera performing high-speed imaging of 240 Hz, the maximum exposure time is $1/240$ seconds, but the minimum exposure time to prevent occurrence of flicker is $1/100$ seconds in a 50 Hz power supply and is $1/120$ seconds in a 60 Hz power supply. Therefore, it is difficult to effectively use the exposure time.

In a video camera using an XY-address-scanning imaging device, when occurrence of flicker is corrected by using a prepared pattern of change in luminance and hue, an optimal correction for a present shutter speed may not be performed if the shutter speed changes because the shutter speed is not taken into consideration.

When flicker is reduced by using frames having a phase difference of 180 degrees, an output image is the sum of two frames, so that the image is unnatural if the image includes a moving subject.

The present invention has been made in view of these circumstances and is directed to reducing flicker that occurs under a fluorescent-lighted environment during imaging performed by a video camera using an XY-address-scanning imaging device.

According to an embodiment of the present invention, there is provided an imaging apparatus including an XY-address-scanning imaging device that performs imaging at a period of $1/2n$ (n is a natural number) of a light intensity fluctuation period of light. The imaging apparatus includes: an integrating unit configured to integrate pixel values of pixels in each of a plurality of areas of an image; a holding unit configured to hold integration values generated by the integrating unit; an operating unit configured to operate a waveform of a differential value between integration values of the same areas in two images having a phase difference of flicker of 180 degrees; an extracting unit configured to extract phase and amplitude of the flicker on the basis of the waveform of the differential value between the integration values operated by the operating unit; a selecting unit configured to select a waveform of the flicker on the basis of shutter speed of the imaging apparatus; and a correcting unit configured to correct the pixel values of the pixels by using a correction value based on the flicker waveform selected by the selecting unit and the phase and amplitude extracted by the extracting unit.

The selecting unit may include a function storing unit configured to store a function to specify the flicker waveform by using the shutter speed as a parameter. The selecting unit may select the flicker waveform from the function stored in the function storing unit on the basis of the shutter speed of the imaging apparatus.

At least one of the integrating unit, the holding unit, the operating unit, the extracting unit, and the selecting unit may intermittently perform a process with respect to an imaging period.

At least one of the integrating unit, the holding unit, the operating unit, the extracting unit, and the selecting unit may perform a process for each color in a time division method.

According to an embodiment of the present invention, there is provided an imaging method for an imaging apparatus including an XY-address-scanning imaging device that performs imaging at a period of $1/2n$ (n is a natural number) of a light intensity fluctuation period of light. The imaging method includes the steps of: integrating pixel values of pixels in each of a plurality of areas of an image; holding integration values generated in the integrating step; operating a waveform of a differential value between integration values of the same areas in two images having a phase difference of flicker of 180 degrees; extracting phase and amplitude of the flicker on the basis of the waveform of the differential value between the integration values operated in the operating step; selecting a waveform of the flicker on the basis of shutter speed of the imaging apparatus; and correcting the pixel values of the pixels by using a correction value based on the flicker waveform selected in the selecting step and the phase and amplitude extracted in the extracting step.

According to an embodiment of the present invention, there is provided a recording medium storing a program to control an imaging apparatus including an XY-address-scanning imaging device that performs imaging at a period of ½n (n is a natural number) of a light intensity fluctuation period of light. The program includes the steps of: integrating pixel values of pixels in each of a plurality of areas of an image; holding integration values generated in the integrating step; operating a waveform of a differential value between integration values of the same areas in two images having a phase difference of flicker of 180 degrees; extracting phase and amplitude of the flicker on the basis of the waveform of the differential value between the integration values operated in the operating step; selecting a waveform of the flicker on the basis of shutter speed of the imaging apparatus; and correcting the pixel values of the pixels by using a correction value based on the flicker waveform selected in the selecting step and the phase and amplitude extracted in the extracting step.

According to an embodiment of the present invention, there is provided a program allowing a computer, the computer controlling an imaging apparatus including an XY-address-scanning imaging device that performs imaging at a period of ½n (n is a natural number) of a light intensity fluctuation period of light, to execute a process including the steps of: integrating pixel values of pixels in each of a plurality of areas of an image; holding integration values generated in the integrating step; operating a waveform of a differential value between integration values of the same areas in two images having a phase difference of flicker of 180 degrees; extracting phase and amplitude of the flicker on the basis of the waveform of the differential value between the integration values operated in the operating step; selecting a waveform of the flicker on the basis of shutter speed of the imaging apparatus; and correcting the pixel values of the pixels by using a correction value based on the flicker waveform selected in the selecting step and the phase and amplitude extracted in the extracting step.

According to an embodiment of the present invention, in an imaging apparatus including an XY-address-scanning imaging device that performs imaging at a period of ½n (n is a natural number) of a light intensity fluctuation period of light, pixel values of pixels in each of a plurality of areas of an image are integrated; integration values are held; a waveform of a differential value between integration values of the same areas in two images having a phase difference of flicker of 180 degrees is operated; phase and amplitude of the flicker are extracted on the basis of the operated waveform of the differential value between the integration values; a waveform of the flicker is selected on the basis of shutter speed of the imaging apparatus; and the pixel values of the pixels are corrected by using a correction value based on the selected flicker waveform and the extracted phase and amplitude.

The imaging apparatus may be an independent apparatus or a block performing an imaging process.

As described above, according to an embodiment of the present invention, flicker that occurs during imaging by a video camera or the like under a fluorescent-lighted environment can be reduced.

Also, according to an embodiment of the present invention, flicker that occurs during high-speed imaging by a video camera using an XY-address-scanning imaging device under a fluorescent-lighted environment can be reduced in accordance with shutter speed.

BRIEF DESCRIPTION OF THE DRAWINGS

FIG. 3 shows a configuration of a digital signal processor shown in FIG. 1 according to another embodiment;

DESCRIPTION OF THE PREFERRED EMBODIMENTS

Figure 1:
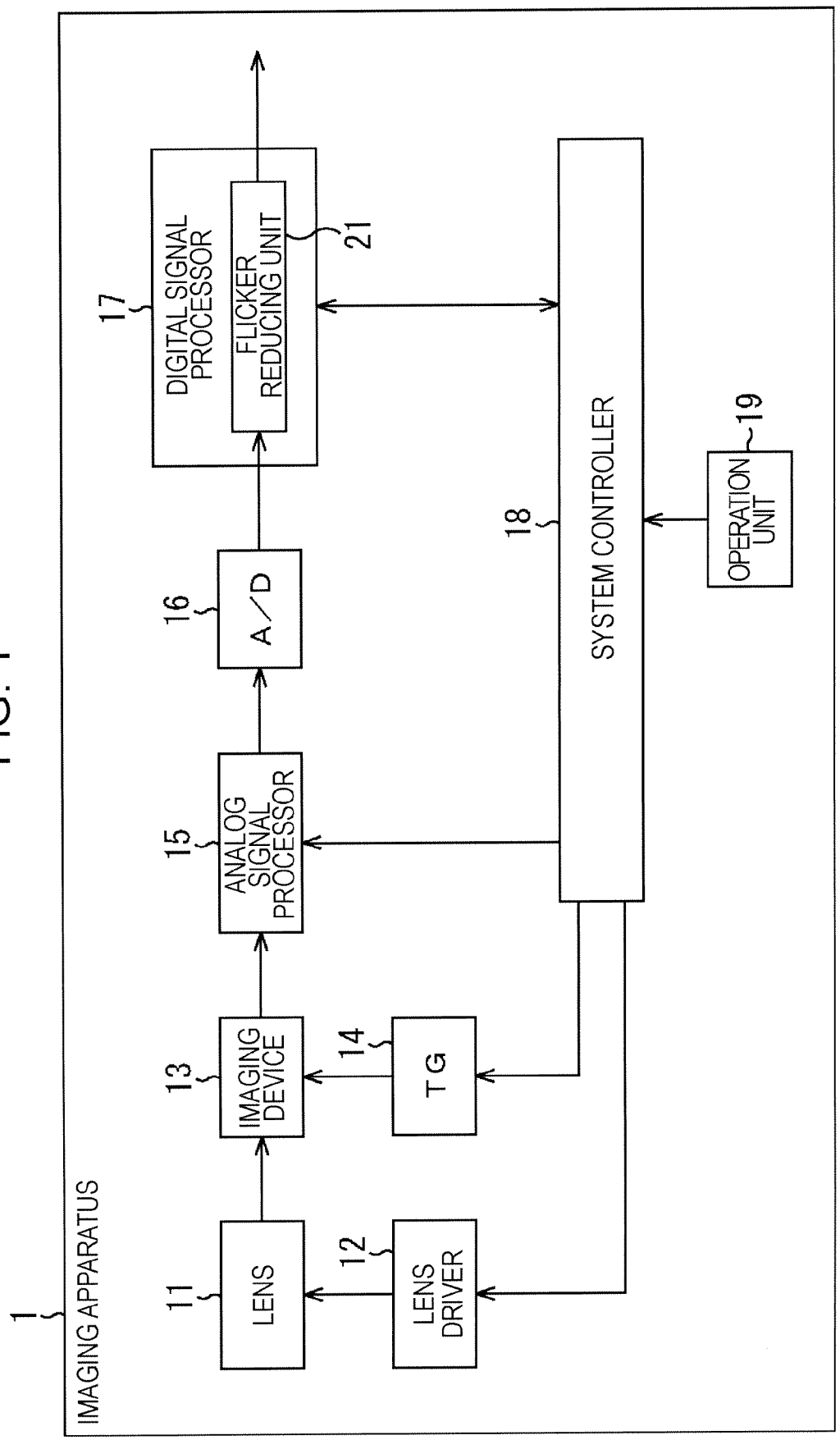
FIG. 1 shows a configuration of an imaging apparatus according to an embodiment of the present invention.

Before describing embodiments of the present invention, the correspondence between the features of the present invention and the specific elements disclosed in embodiments of the present invention is discussed below. This description is intended to assure that an embodiment supporting the present invention is described in this specification. Thus, even if an element in the following embodiments is not described as relating to a certain feature of the present invention, that does not necessarily mean that the element does not relate to that feature. Conversely, even if an element is described herein as relating to a certain feature, that does not necessarily mean that the element does not relate to other features.

An imaging apparatus according to an embodiment of the present invention is an imaging apparatus including an XY-address-scanning imaging device (e.g., an imaging device 13 shown in FIG. 1) that performs imaging at a period of ½n (n is a natural number) of a light intensity fluctuation period of light. The imaging apparatus includes: an integrating unit (e.g., an integrating unit 102 shown in FIG. 4) configured to integrate pixel values of pixels in each of a plurality of areas of an image; a holding unit (e.g., an integration value holder 103 shown in FIG. 4) configured to hold integration values generated by the integrating unit; an operating unit (e.g., an integration value operating unit 111 shown in FIG. 4) configured to operate a waveform of a differential value between integration values of the same areas in two images having a phase difference of flicker of 180 degrees; an extracting unit (e.g., a phase-and-amplitude extractor 112 shown in FIG. 4) configured to extract phase and amplitude of the flicker on the basis of the waveform of the differential value between the integration values operated by the operating unit; a selecting unit (e.g., a function selector 114 shown in FIG. 4) configured to select a waveform of the flicker on the basis of shutter speed of the imaging apparatus; and a correcting unit (e.g., a correcting unit 105 shown in FIG. 4) configured to correct the pixel values of the pixels by using a correction value based on the flicker waveform selected by the selecting unit and the phase and amplitude extracted by the extracting unit.

The selecting unit (e.g., the function selector 114 shown in FIG. 4) may include a function storing unit (e.g., a memory 114*a* shown in FIG. 4) configured to store a function to specify the flicker waveform by using the shutter speed as a parameter. The selecting unit may select the flicker waveform from the function stored in the function storing unit on the basis of the phase and amplitude extracted by the extracting unit and the shutter speed of the imaging apparatus.

At least one of the integrating unit (e.g., the integrating unit 102 shown in FIG. 2), the holding unit (e.g., the integration value holder 103 shown in FIG. 4), the operating unit (e.g., the integration value operating unit 111 shown in FIG. 4), the extracting unit (e.g., the phase-and-amplitude extractor 112 shown in FIG. 4), and the selecting unit (e.g., the function selector 114 shown in FIG. 4) may intermittently perform a process with respect to an imaging period.

At least one of the integrating unit (e.g., the integrating unit 102 shown in FIG. 2), the holding unit (e.g., the integration value holder 103 shown in FIG. 4), the operating unit (e.g., the integration value operating unit 111 shown in FIG. 4), the extracting unit (e.g., the phase-and-amplitude extractor 112 shown in FIG. 4), and the selecting unit (e.g., the function selector 114 shown in FIG. 4) may perform a process for each color in a time division method.

An imaging method and a program according to an embodiment of the present invention are an imaging method for an imaging apparatus including an XY-address-scanning imaging device that performs imaging at a period of ½n (n is a natural number) of a light intensity fluctuation period of light, and a program executed by a computer controlling the imaging apparatus. The imaging method and the program include the steps of: integrating pixel values of pixels in each of a plurality of areas of an image (e.g., step S22 of a flowchart shown in FIG. 7); holding integration values generated in the integrating step (e.g., step S23 of the flowchart shown in FIG. 7); operating a waveform of a differential value between integration values of the same areas in two images having a phase difference of flicker of 180 degrees (e.g., step S24 of the flowchart shown in FIG. 7); extracting phase and amplitude of the flicker on the basis of the waveform of the differential value between the integration values operated in the operating step (e.g., step S27 of the flowchart shown in FIG. 7); selecting a waveform of the flicker on the basis of shutter speed of the imaging apparatus (e.g., step S28 of the flowchart shown in FIG. 7); and correcting the pixel values of the pixels by using a correction value based on the flicker waveform selected in the selecting step and the phase and amplitude extracted in the extracting step (e.g., step S31 of the flowchart shown in FIG. 7).

FIG. 1 shows a configuration of an imaging apparatus (video camera) 1 according to an embodiment of the present invention.

The imaging apparatus 1 is a so-called video camera, performs imaging (moving images), and outputs the images as data.

A lens 11 adjusts a focal length by using a lens driver 12 and allows light from a subject to pass therethrough to an imaging device 13.

The imaging device 13 includes an XY-address-scanning imaging device, such as a CMOS (complementary metal-oxide semiconductor) imaging device. Upon receiving light from a subject via the lens 11, the imaging device 13 generates a corresponding analog video signal by photoelectric conversion and outputs the signal to an analog signal processor 15 in accordance with a signal generated by a timing generator (TG) 14.

More specifically, the imaging device 13 includes a plurality of pixels, each including a photodiode (photogate), a transfer gate (shutter transistor), a switching transistor (address transistor), an amplifier transistor, and a reset transistor (reset gate). The plurality of pixels are two-dimensionally arranged on a CMOS substrate. Also, the imaging device 13 includes a vertical scanning circuit, a horizontal scanning circuit, and a video signal output circuit.

The analog video signal obtained from the imaging device 13 includes primary-color signals of RGB or a chrominance signal of a complementary color.

The analog signal processor 15 includes an integrated circuit (IC), is controlled by a system controller 18, samples and holds the analog video signal supplied from the imaging device 13 in units of chrominance signals, controls gain by automatic gain control (AGC), and outputs the analog video signal to an analog to digital (A/D) converter 16.

The A/D converter 16 converts the analog signal supplied from the analog signal processor 15 to a digital signal and supplies the digital signal to a digital signal processor 17.

The digital signal processor 17 is constituted as an IC, for example, reduces a flicker component of each signal component in a flicker reducing unit 21 provided therein, and eventually converts the digital signal to a luminance signal Y and red and blue color-difference signals R−Y and B−Y, which are then output.

The system controller 18 includes a microcomputer or the like and controls an entire operation of the imaging apparatus 1.

More specifically, the system controller 18 supplies a lens drive control signal to the lens driver 12 including an IC and controls the lens driver 12, so as to drive the lens 11.

Also, the system controller 18 supplies a timing control signal to the TG 14 so as to control the TG 14, and allows the TG 14 to supply various timing signals to the imaging device 13 so as to drive the imaging device 13.

Furthermore, the system controller 18 captures a detection signal of respective signal components from the digital signal processor 17 and supplies an AGC signal to the analog signal processor 15, so as to control the gain of each chrominance signal and to control signal processing in the digital signal processor 17.

Also, the system controller 18 connects to an operation unit 19 functioning as a user interface via an interface, such as a microcomputer. With this configuration, a setting operation or a selecting operation performed in the operation unit 19 is detected by the system controller 18, and a setting state or a control state of the camera is displayed in a display unit (not shown) by the system controller 18.

The flicker described in the following description is flicker of fluorescent light using a commercial power supply of 60 Hz. In this case, assume that the period of the flicker is 120 Hz and that an imaging period during imaging by the imaging device 13 is 240 Hz. However, the frequency of the power supply of the fluorescent light, the period of the flicker, and the imaging period are not limited to those values.

Hereinafter, a configuration of the digital signal processor 17 to process primary-color signals is described with reference to FIG. 2.

The imaging apparatus 1 for primary-color signals is provided with a separating optical system (not shown) to separate light from a subject into light rays of R, G, and B, the optical system including the lens 11 shown FIG. 1. The imaging device 13 has a 3-plate configuration for R, G, and B colors or a 1-plate configuration having color filters of R, G, and B sequentially arranged in the horizontal direction on an incidence plane in each pixel. In this case, primary-color signals of RGB are read in parallel from the imaging device 13.

A clamp circuit 31 clamps the black level of input RGB primary-color signals to a predetermined level and outputs the signals to a gain adjuster 32. The gain adjuster 32 adjusts the gain of the clamped RGB primary-color signals in accordance with the amount of exposure and outputs the RGB primary-color signals to corresponding flicker reducing units 21R, 21G, and 21B. The flicker reducing units 21R, 21G, and 21B reduce flicker components in the gain-adjusted RGB primary-color signals and output the signals to a white balance adjuster 33. In the following description, the flicker reducing units 21R, 21G, and 21B are collectively referred to as a flicker reducing unit 21 if they need not be distinguished from each other.

The white balance adjuster 33 adjusts the white balance of the flicker-reduced RGB primary-color signals and outputs the signals to a gamma correcting circuit 34. The gamma correcting circuit 34 converts the gradation of the white-balance-adjusted RGB primary-color signals and outputs the signals to a synthetic matrix circuit 35. The synthetic matrix circuit 35 generates a luminance signal Y and color-difference signals R−Y and B−Y on the basis of the gamma-corrected RGB primary-color signals and outputs the generated signals.

Figure 2:
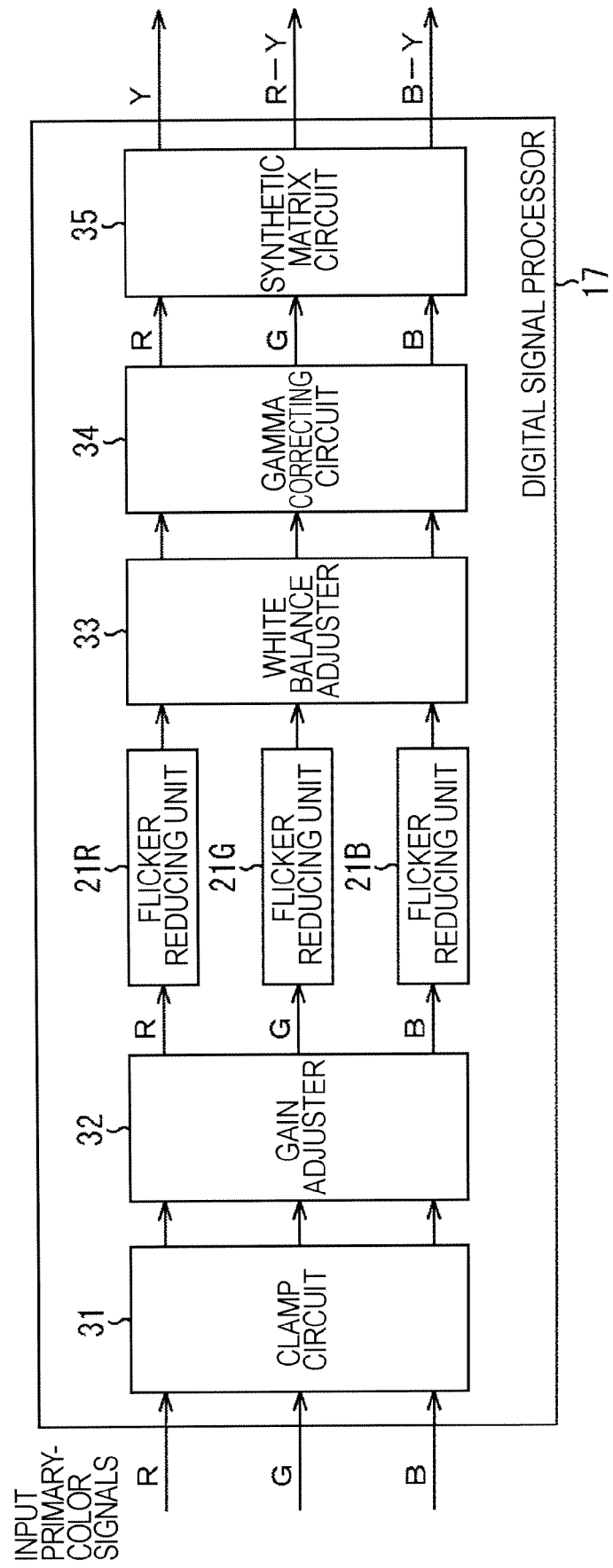
FIG. 2 shows a configuration of a digital signal processor shown in FIG. 1 according to an embodiment.

In a typical configuration for primary-color signals, a luminance signal Y is generated after an entire process on RGB primary-color signals has completed, as shown in FIG. 2. Since flicker components in the RGB primary-color signals are reduced during the process of the RGB primary-color signals, flicker components in each color component and a luminance component can be sufficiently reduced.

The flicker reducing units 21R, 21G, and 21B are desirably arranged in the manner shown in FIG. 2, but the arranging manner is not limited to this.

Next, a configuration of the digital signal processor 17 to process complementary-color signals is described with reference to FIG. 3. In FIG. 3, parts that are the same as those of the digital signal processor 17 for primary-color signals shown in FIG. 2 are denoted by the same reference numerals, and the corresponding description is omitted.

In the imaging apparatus 1 for complementary-color signals, the imaging device 13 has a one-plate configuration in which a complementary-color filter is provided on an incidence plane. As shown in FIG. 3 as a color filter 51, in the complementary-color filter, green color filter segments 51G and magenta color filter segments 51Mg are alternately arranged in every pixel in the horizontal direction at a horizontal-line position Lo provided every other line, and cyan color filter segments 51Cy and yellow color filter segments 51Ye are alternately arranged in every pixel in the horizontal direction at a horizontal-line position Le provided every other line.

In this case, video signals of two adjacent horizontal-line positions are read from the imaging device 13 shown in FIG. 1 while being combined. Thus, in the example shown in FIG. 3, a composite signal of a green signal and a cyan signal and a composite signal of a magenta signal and a yellow signal can be alternately obtained from the imaging device 13 at every pixel clock in each horizontal period.

The clamp circuit 31 of the digital signal processor 17 shown in FIG. 3 clamps the black level of the complementary-color signal to a predetermined level and supplies the signal to the gain adjuster 32. The gain adjuster 32 adjusts the gain of the clamped complementary-color signal in accordance with the amount of exposure and supplies the signal to a luminance synthesizer 41. The luminance synthesizer 41 generates a luminance signal Y from the gain-adjusted complementary-color signal and outputs the generated signal to a flicker reducing unit 21Y. A primary color separator 43 generates RGB primary-color signals from the gain-adjusted complementary-color signal and outputs the generated signals to the corresponding flicker reducing units 21R, 21G, and 21B.

The flicker reducing unit 21Y of the digital signal processor 17 shown in FIG. 3 reduces a flicker component in the luminance signal Y from the luminance synthesizer 41 and supplies the luminance signal Y to a gamma correcting unit 42. The flicker reducing units 21R, 21G, and 21B reduce flicker components in the RGB primary-color signals from the primary color separator 43 and supply the signals to the white balance adjuster 33.

The gamma correcting circuit 42 of the digital signal processor 17 shown in FIG. 3 corrects the gradation of the flicker-reduced luminance signal and outputs the luminance signal Y. The white balance adjuster 33 adjusts the white balance of the flicker-reduced RGB primary-color signals and outputs the signals to the gamma correcting circuit 34. The gamma correcting circuit 34 converts the gradation of the white-balance-adjusted RGB primary-color signals and outputs the signals to the synthetic matrix circuit 35. The synthetic matrix circuit 35 generates color-difference signals R−Y and B−Y from the gamma-corrected RGB primary-color signals and outputs the generated signals.

In the configuration for complementary-color signals, a luminance signal and RGB primary-color signals are generated in a relatively early stage of the digital signal processor 17, as shown in FIG. 3. This is because the luminance signal can be easily generated by a simple adding process by using the above-described composite signals. Also, the RGB primary-color signals are generated by a differential process on the above-described composite signals. If the luminance signal is generated from the RGB primary-color signals, the S/N of the luminance signal deteriorates.

However, when separate processing systems for a luminance signal and chrominance signals are provided, only reducing a flicker component of each color component is insufficient to reduce a flicker component of a luminance component. The flicker components of both the color components and luminance component can be sufficiently reduced by independently reducing the flicker component of the luminance component as shown in FIG. 3.

The flicker reducing units 21Y, 21R, 21G, and 21B are desirably arranged in the manner shown in FIG. 3. However, the arranging manner is not limited to this.

Figure 4:
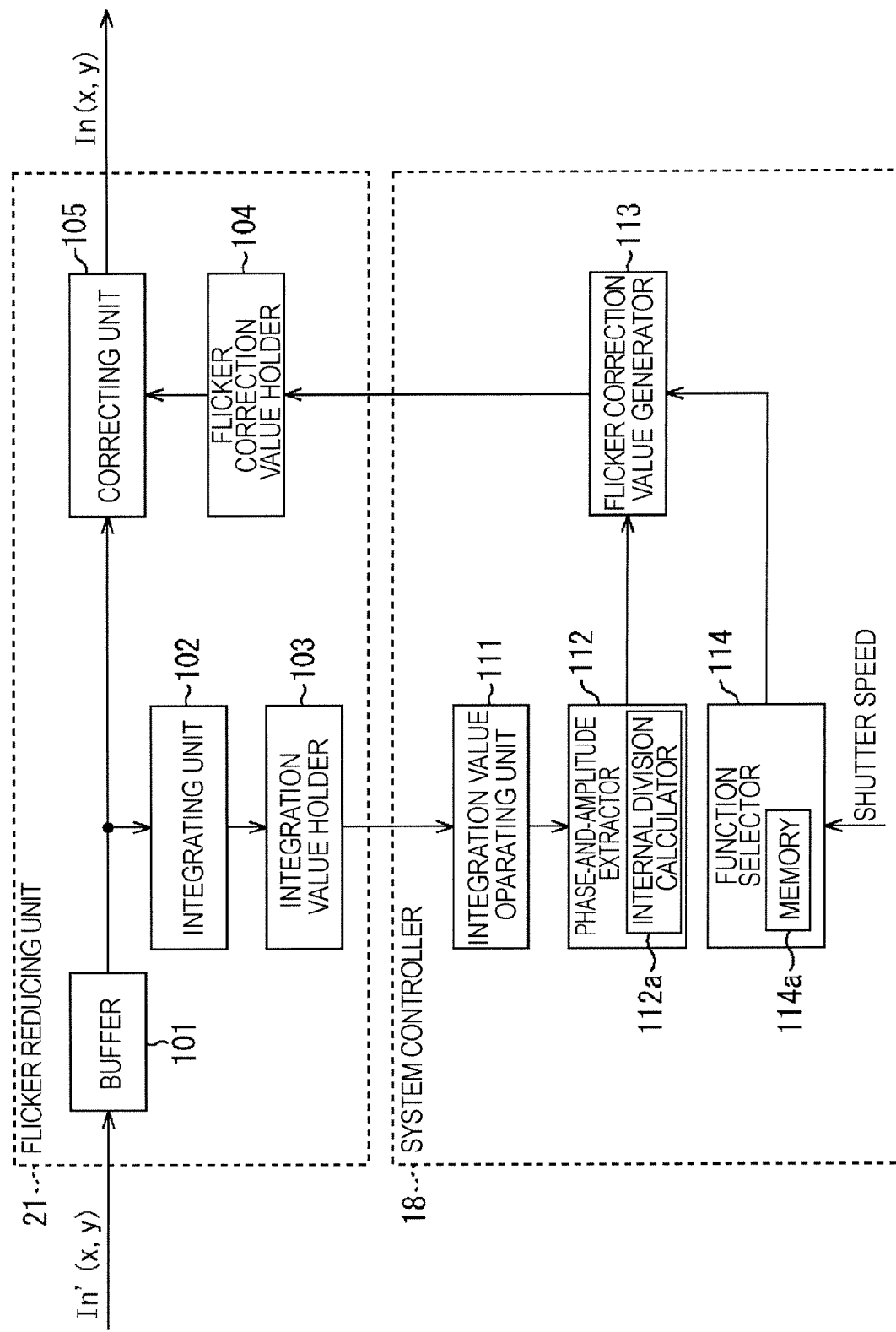
FIG. 4 shows a configuration of a flicker reducing unit shown in FIG. 1 according to an embodiment.

Hereinafter, a configuration of the flicker reducing unit 21 according to an embodiment is described with reference to FIG. 4. The flicker reducing unit 21 realizes a flicker reducing process in cooperation with the system controller 18. Thus, FIG. 4 illustrates a function to realize the flicker reducing process of the system controller 18, together with the flicker reducing unit 21. In FIG. 4, the functions of the flicker reducing unit 21 and the system controller 18 are separately provided. However, the configuration is not limited to that shown in FIG. 4. For example, the function realized by the system controller 18 can be integrated with the flicker reducing unit 21. Conversely, the function of the flicker reducing unit 21 can be integrated with the system controller 18.

A buffer 101 temporarily stores an image signal input thereto and supplies the image signal to an integrating unit 102 and a correcting unit 105 in the subsequent stages as necessary.

The integrating unit 102 integrates (adds) pixel values of pixels in units of laterally-long blocks that are formed by dividing a screen in the vertical direction, and allows an integration value holder 103 to hold integration values. The integration value holder 103 keeps to hold the integration values until data communication with the system controller 18 ends.

An integration value operating unit 111 reads an integration value held by the integration value holder 103, calculates a value forming a waveform from which phase and amplitude of flicker are extracted, and supplies a calculation result to a phase-and-amplitude extractor 112.

The phase-and-amplitude extractor 112 extracts phase and amplitude on the basis of information of the waveform supplied from the integration value operating unit 111. The phase-and-amplitude extractor 112 extracts the phase and amplitude of the waveform by obtaining a rising zero-cross point. If sampling of the waveform is rough, no zero-cross point exists. Thus, the phase-and-amplitude extractor 112 includes an internal division calculator 112a to calculate a zero-cross point by using an internally dividing point, so that the resolution of the phase can be enhanced.

A function selector 114 allows a memory 114a provided therein to store functions of flicker waveforms that are set for respective shutter speeds, selects a function indicating a flicker waveform according to the shutter speed, and supplies the selected function to a flicker correction value generator 113. The functions of the flicker waveforms are flicker waveforms set for respective shutter speeds, the amplitude and phase calculated by the integration value operating unit 111 being parameters.

The flicker correction value generator 113 generates a function of a theoretical flicker waveform by using the function of a flicker waveform supplied from the function selector 114 and the phase and amplitude supplied from the phase-and-amplitude extractor 112 as parameters, also generates a correction value to be stored in a table, and allows the flicker correction value holder 104 to hold the table.

The flicker correction value holder 104 holds the table of flicker correction values generated by the flicker correction value generator 113 and supplies a correction value to the correcting unit 105 when called therefrom.

The correcting unit 105 sequentially reads pixel values from the buffer 101. When the pixel value is not saturated, the correcting unit 105 reads a correction value held by the flicker correction value holder 104 in a form of table, corrects the pixel value affected by flicker, and outputs the corrected pixel value.

Figure 5:
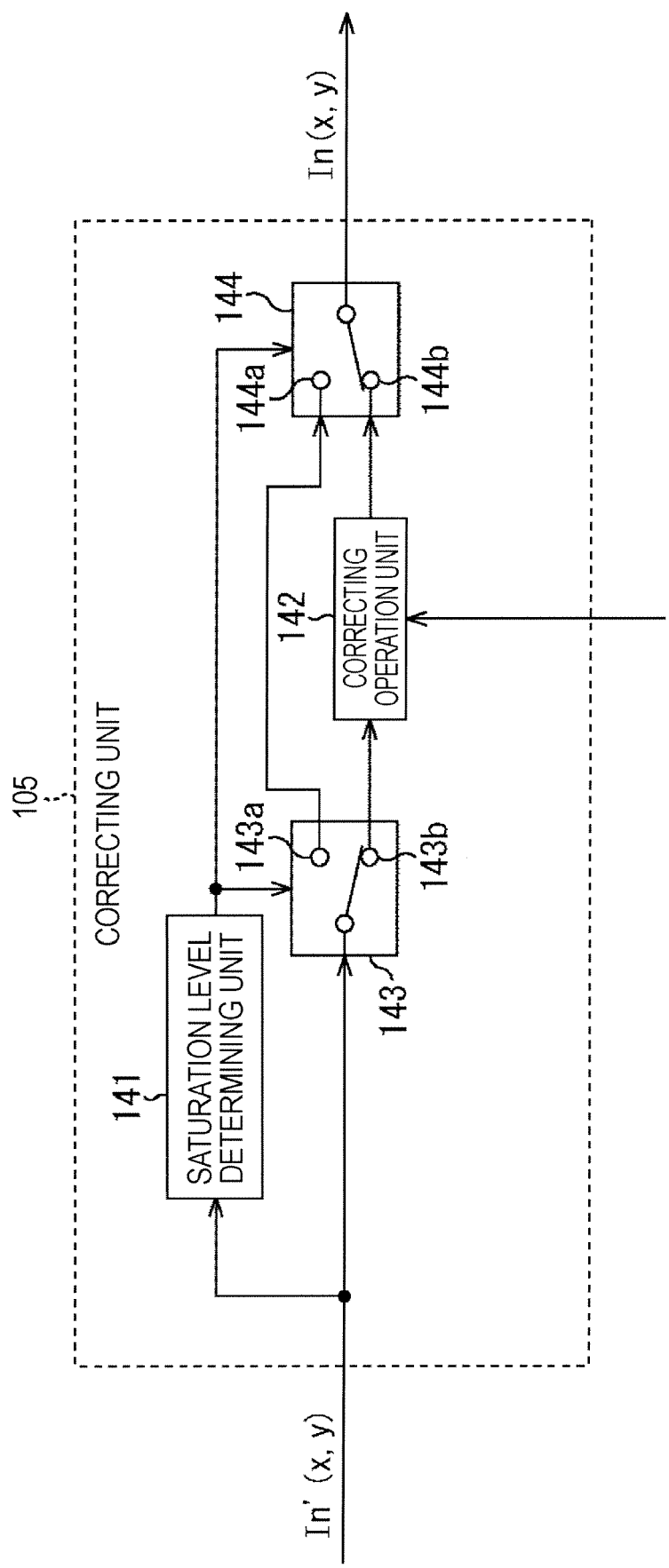
FIG. 5 shows a configuration of a correcting unit shown in FIG. 1 according to an embodiment.

Next, a specific configuration of the correcting unit 105 shown in FIG. 4 is described with reference to FIG. 5.

A saturation level determining unit 141 controls switches 143 and 144 on the basis of whether each pixel value of an input image is saturated, that is, whether the pixel value is a maximum value. If the pixel value is saturated, the switches are connected to terminals 143a and 144a, respectively, so that a correcting operation unit 142 does not perform a correcting operation. If the pixel value is not saturated, the switches are connected to terminals 143b and 144b, respectively, so that the correcting operation unit 142 performs a correcting operation.

The correcting operation unit 142 reads a flicker correction value held by the flicker correction value holder 104. When the switches 143 and 144 connect to the terminals 143a and 144a, respectively, the correcting operation unit 142 subtracts the correction value from the pixel value of the pixel of the input image signal, so as to correct the pixel value and output the corrected pixel value.

Figure 6:
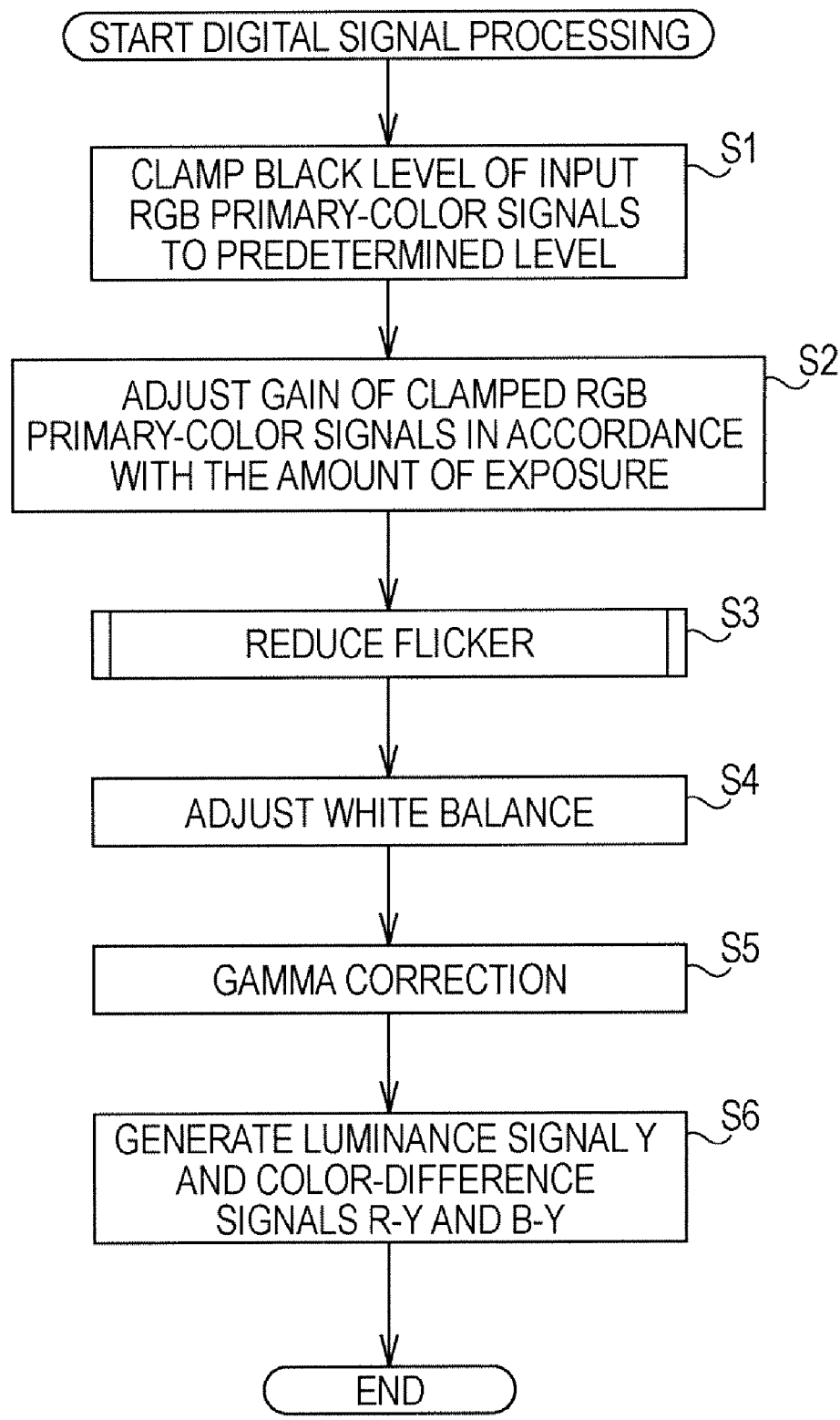
FIG. 6 is a flowchart illustrating digital signal processing.

Hereinafter, digital signal processing performed by the digital signal processor 17 for primary colors shown in FIG. 2 is described with reference to FIG. 6.

In step S1, the clamp circuit 31 clamps the black level of input RGB primary-color signals to a predetermined level and supplies the signals to the gain adjuster 32.

In step S2, the gain adjuster 32 adjusts the gain of the clamped RGB signals supplied from the clamp circuit 31 in accordance with the amount of exposure and supplies the RGB signals to the corresponding flicker reducing units 21A to 21C.

In step S3, the flicker reducing units 21A to 21C perform a flicker reducing process, that is, reduce flicker components in the gain-adjusted RGB signals, and outputs the signals to the white balance adjuster 33. The flicker reducing process is described below with reference to FIG. 7.

In step S4, the white balance adjuster 33 adjusts the white balance on the basis of the flicker-reduced RGB signals and supplies the signals to the gamma correcting circuit 34.

In step S5, the gamma correcting circuit 34 performs gamma correction on the white-balance-adjusted RGB signals and supplies the signals to the synthetic matrix circuit 35.

In step S6, the synthetic matrix circuit 35 generates a luminance signal Y and color-difference signals R−Y and R−B on the basis of the gamma-corrected RGB signals and supplies the generated signals.

Accordingly, the luminance signal Y and the color-difference signals R−Y and R−B in which flicker components have been reduced are generated on the basis of the digital-converted RGB signals. Incidentally, digital signal processing performed by the digital signal processor 17 for complementary colors is basically the same as that for primary-colors, except that the color filter 51 is used and that the luminance signal Y is separately processed in the subsequent stage of the gain adjuster 32, and thus the corresponding description is omitted.

Figure 7:
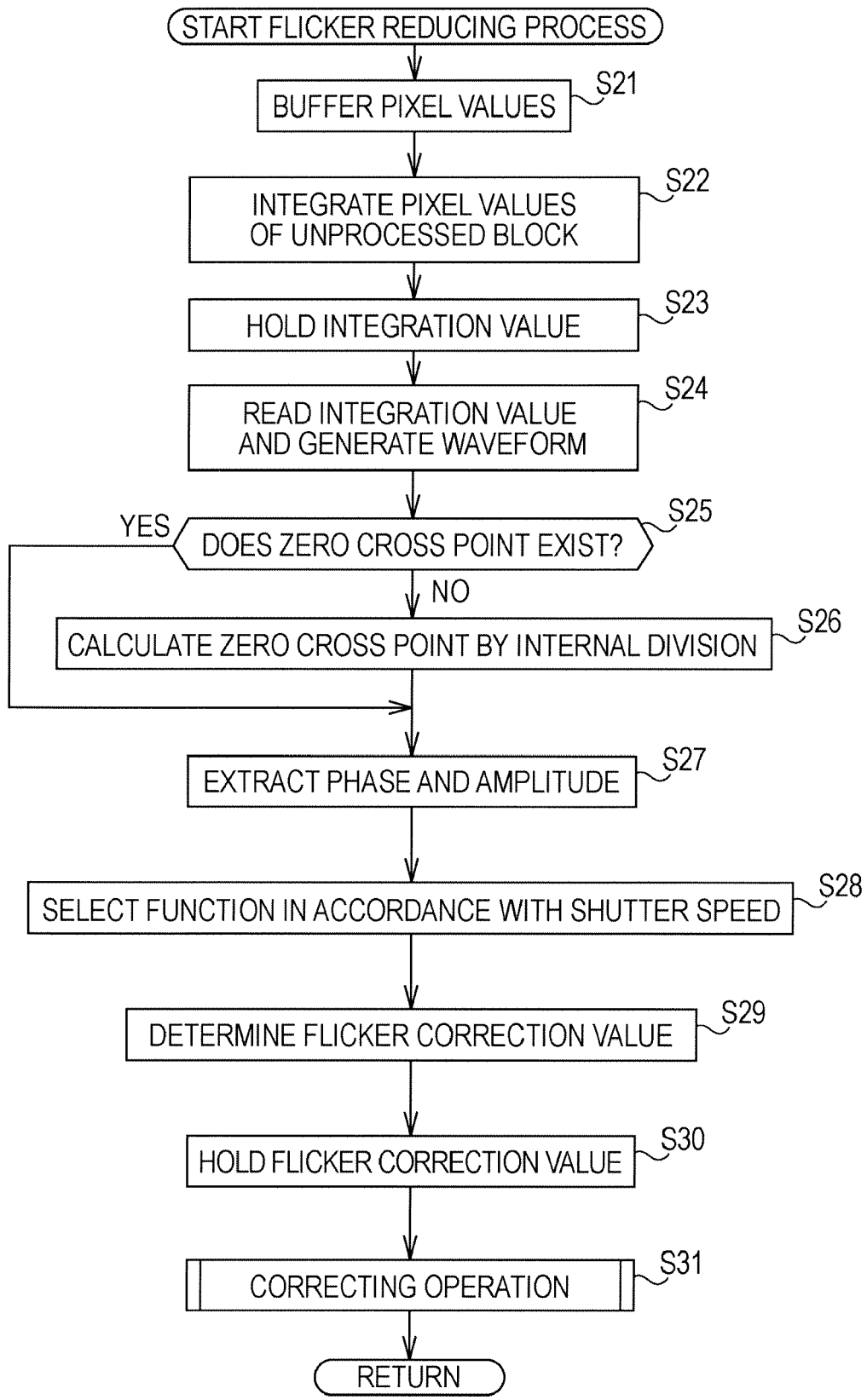
FIG. 7 is a flowchart illustrating a flicker reducing process.

Next, the flicker reducing process is described with reference to the flowchart shown in FIG. 7.

In step S21, the buffer 101 sequentially buffers input image signals in units of fields.

Figure 8:
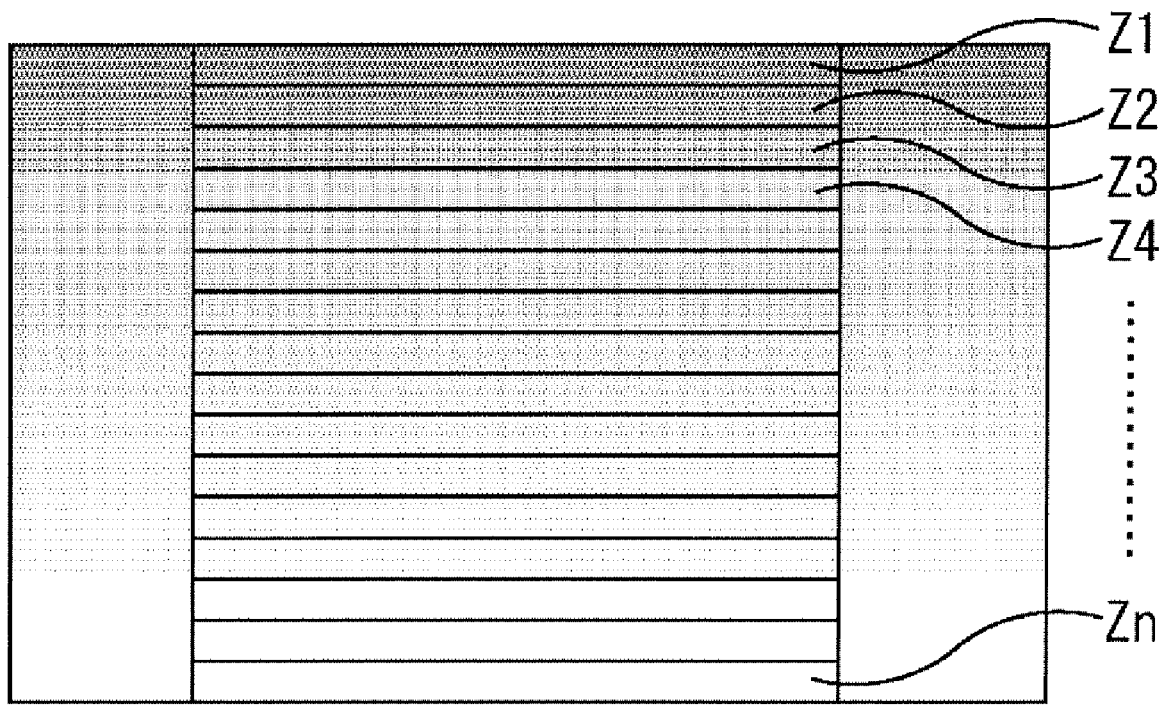
FIG. 8 illustrates blocks used as a unit of an integrating process.

In step S22, the integrating unit 102 sequentially integrates pixel values of pixels included in an area of blocks generated by dividing an image signal of one field in the vertical direction among the image signals stored in the buffer 101, as shown in FIG. 8. In step S23, the integrating unit 102 supplies the integration value to the integration value holder 103 so as to be held therein.

FIG. 8 shows an image signal corresponding to one field, which includes n blocks Z1 to Zn aligned in the vertical direction. The integrating unit 102 integrates (adds) pixel values of pixels included in each block Zi (i is a natural number from 1 to n) and allows the integration value holder 103 to hold an integration value Int(i) as an integration result.

In step S24, the integration value operating unit 111 operates the integration value Int(i) held in the integration value holder 103 so as to generate a waveform from which amplitude and phase of flicker are to be extracted. More specifically, the integration value operating unit 111 selects two fields (e.g., adjacent fields) having a phase difference of 180 degrees, as shown in FIG. 9, from among the integration values Int(i) held in the integration value holder 103, and calculates the following expression (1) by using those integration values so as to obtain a waveform Fk(i).

$$Fk(i)=(Int(i)-Int2(i))/(Int1(i)+int2(i)) \text{ (if } i=1, 2 \ldots n)$$

$$Fk(i)=-Fk(i-n) \text{ (if } i=n+1, n+2 \ldots 2n) \qquad (1)$$

Figure 9:
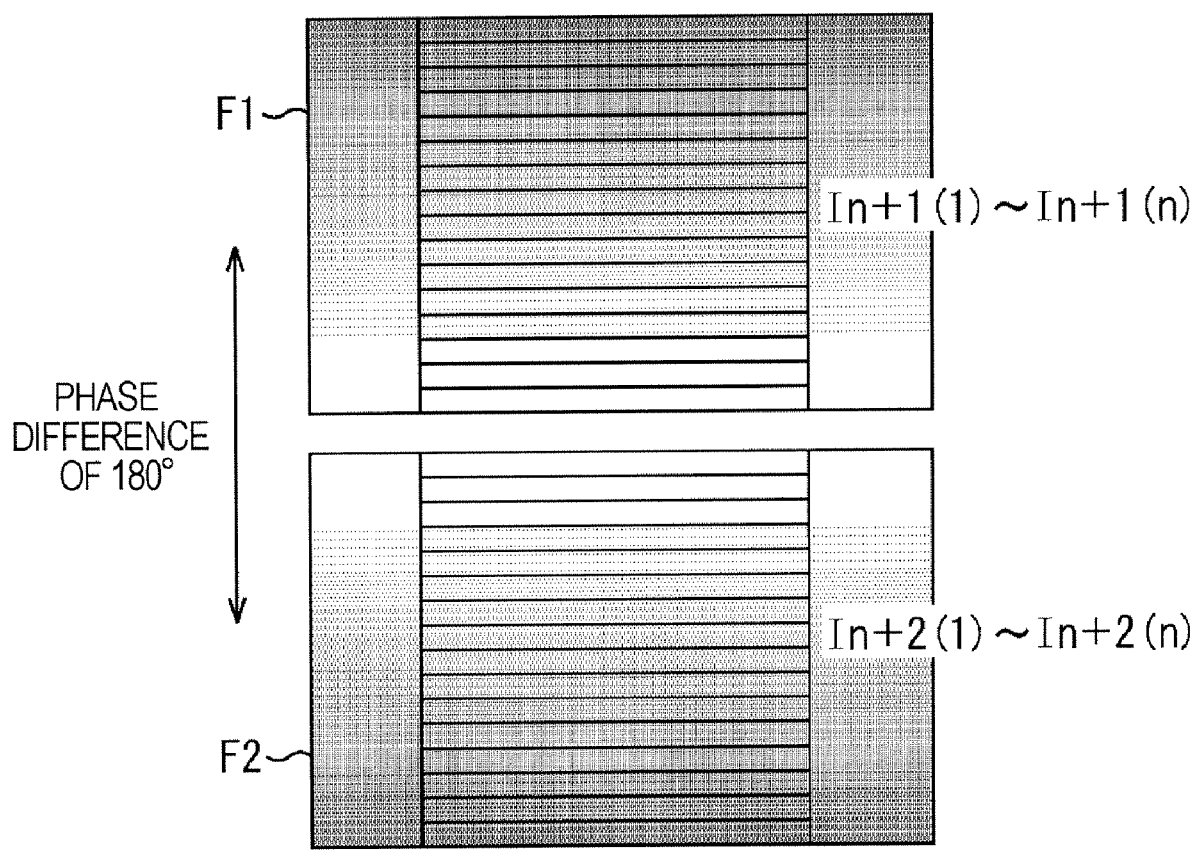
FIG. 9 illustrates a process performed by an integration value operating unit.

Herein, $Int1(1)$ to $Int1(n)$ are integration values of blocks Z1 to Zn of field F1 shown in FIG. 9, whereas $Int2(1)$ to $Int2(n)$ are integration values of blocks Z1 to Zn of field F2. Fields F1 and F2 are adjacent to each other. $Int1(n+1)$ to $Int1(2n)$ are integration values of blocks Z1 to Zn of field F3 (not shown) adjacent to field F2 shown in FIG. 9, and $Int2(n+1)$ to $Int2(2n)$ are integration values of blocks Z1 to Zn of field F4 adjacent to field F3.

In expression (1), a calculation result of fields F1 and F2 is used for calculation of fields F3 and F4. Therefore, integration values of two fields may be read.

Figure 10A:
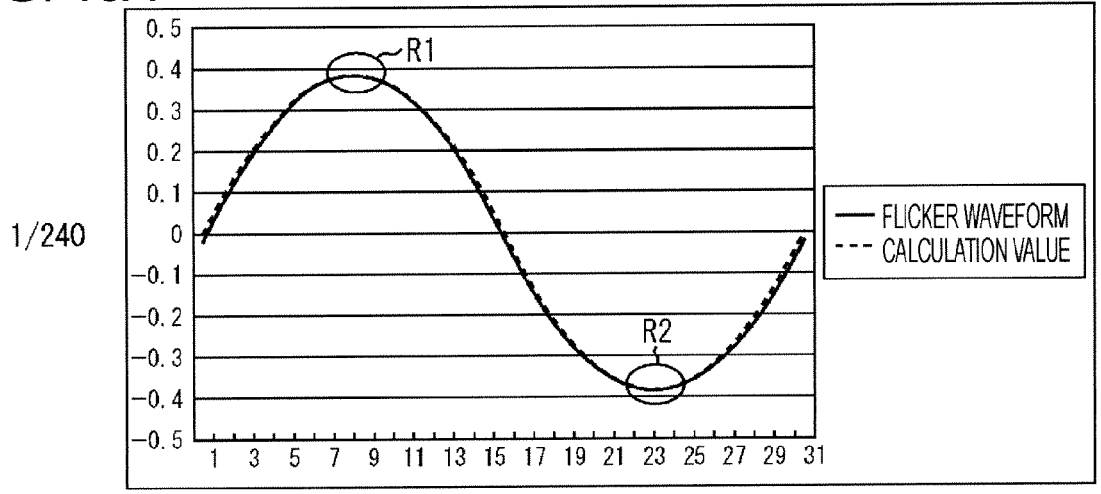
FIGS. 10A to 10C illustrate the process performed by the integration value operating unit.
Figure 10B:
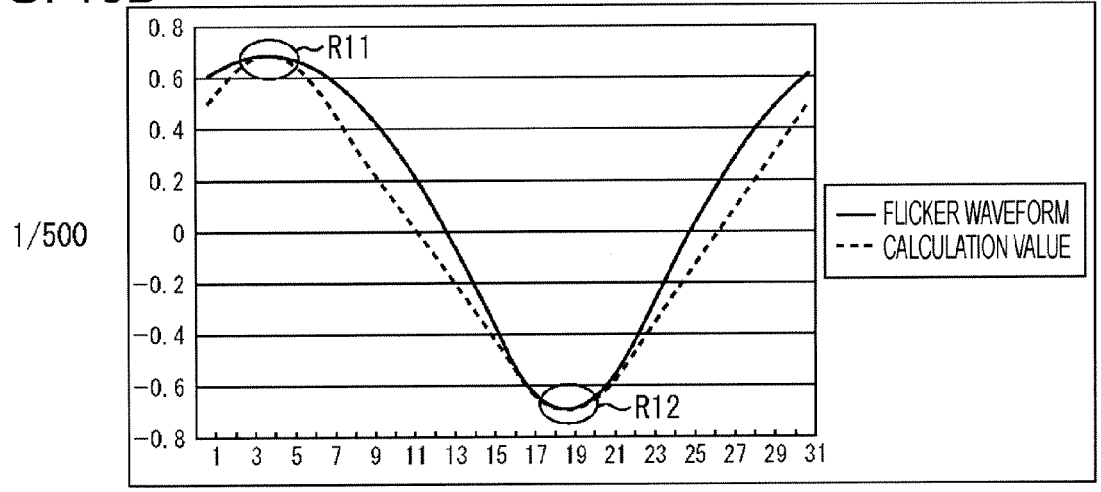
Figure 10C:
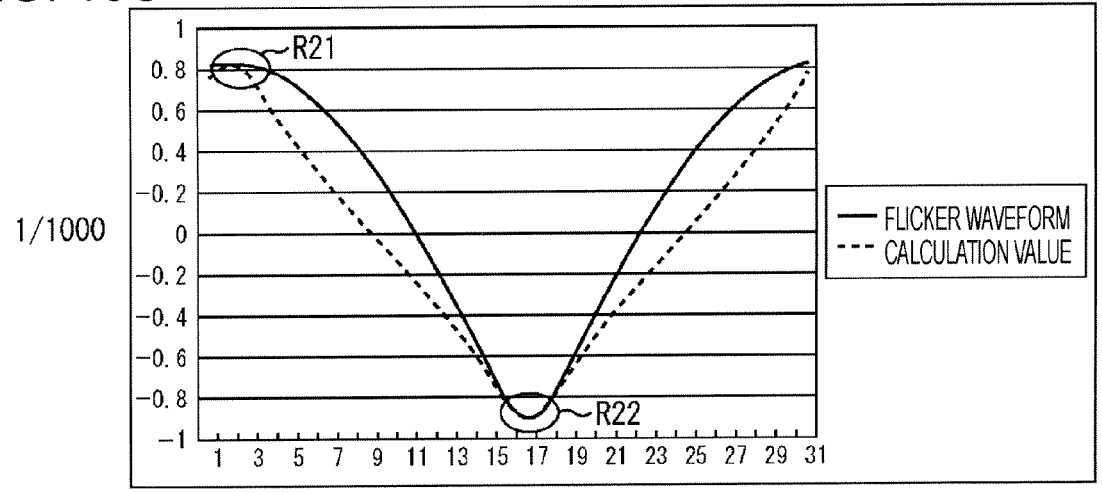

The waveform Fk(i) calculated in expression (1) has waveforms indicated by broken lines shown in FIGS. 10A to 10C. FIGS. 10A to 10C show a relationship between a flicker waveform (solid line) and the waveform Fk(i) in shutter speeds of 1/240 seconds, 1/500 seconds, and 1/1000 seconds. In each figure, the horizontal axis indicates blocks Zi and the vertical axis indicates amplitude.

As shown in FIGS. 10A to 10C, a difference between the waveform Fk(i) and the flicker waveform is small when the shutter speed is low, but the difference becomes significant as the shutter speed becomes higher. However, when attention is put on circles R1, R2, R11, R12, R21, and R22 in FIGS. 10A to 10C, the both waveforms match in phase and amplitude.

Therefore, the phase-and-amplitude extractor 112 obtains the phase and amplitude of flicker by using the waveform Fk(i). At this time, the phase-and-amplitude extractor 112 regards the rising zero-cross point of the waveform Fk(i) as a rising phase of the flicker as shown in area A in FIG. 11, and regards the amplitude at the position of π/2 ahead of the rising phase as the amplitude of flicker as shown in area B in FIG. 11. Note that the zero-cross point is not always obtained depending on blocks Z1 to Zn.

Figure 12:
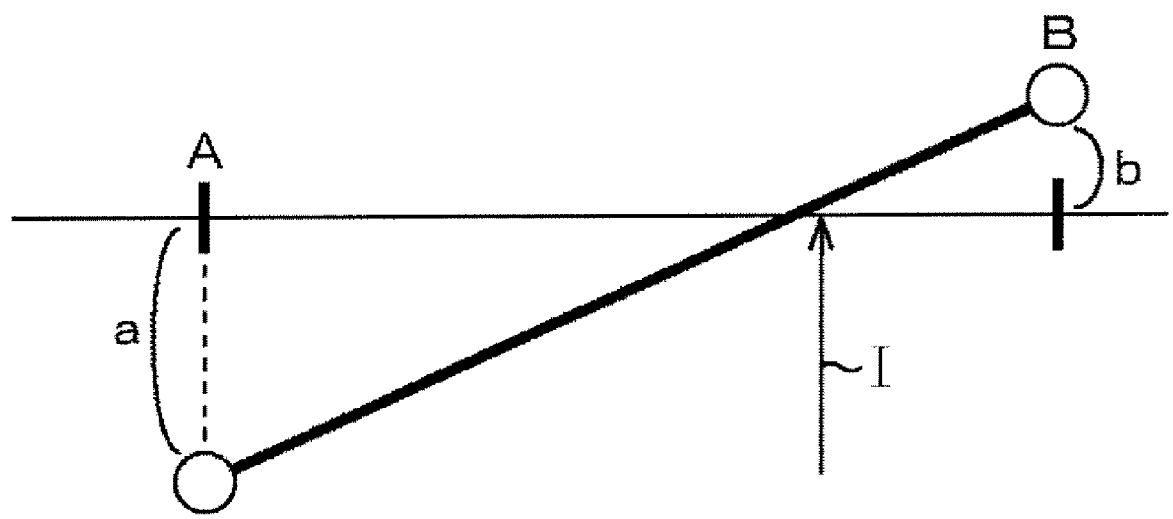
FIG. 12 illustrates a method for obtaining a zero-cross point by internal division.

Therefore, the phase-and-amplitude extractor 112 determines whether a zero-cross point exists in step S25. For example, if it is determined that no zero-cross point exists due to blocks Z1 to Zn, the process proceeds to step S26, where the phase-and-amplitude extractor 112 allows the internal division calculator 112a to calculate the phase of an internally dividing point as a zero-cross point. For example, when two integration values "a" and "b" exist on phases A and B, respectively, with a zero amplitude therebetween, as shown in FIG. 12, the internal division calculator 112a calculates the following expression (2) so as to obtain an internally dividing point phase I as a zero-cross point.

$$I=A+(B-A)\times a/(a+b) \qquad (2)$$

On the other hand, if it is determined in step S25 that a zero-cross point exists, step S26 is skipped.

Figure 11:
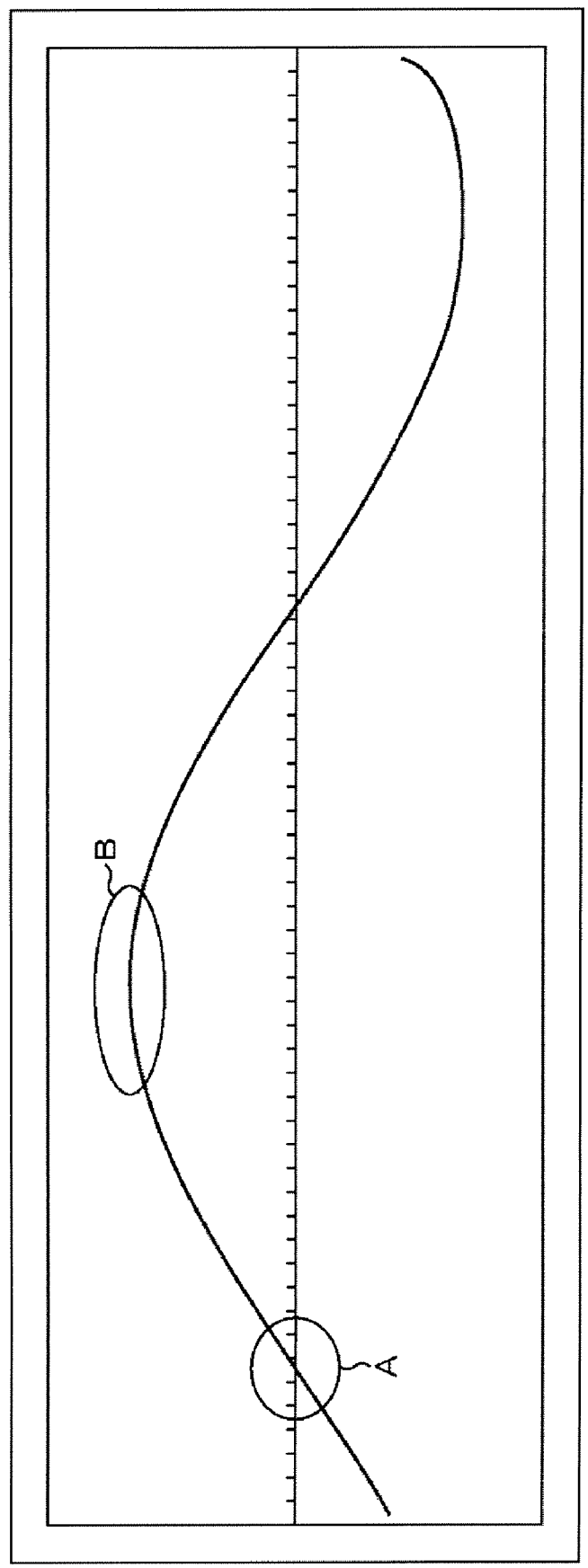
FIG. 11 illustrates a process of obtaining phase and amplitude.

In step S27, the phase-and-amplitude extractor 112 extracts the rising zero-cross point of the waveform Fk(i) as a rising phase of flicker as shown in area A in FIG. 11, also extracts the amplitude near the position of π/2 ahead of the rising phase as an amplitude of flicker as shown in area B in FIG. 11, and supplies the extracted phase and amplitude to the flicker correction value generator 113.

Figure 13:
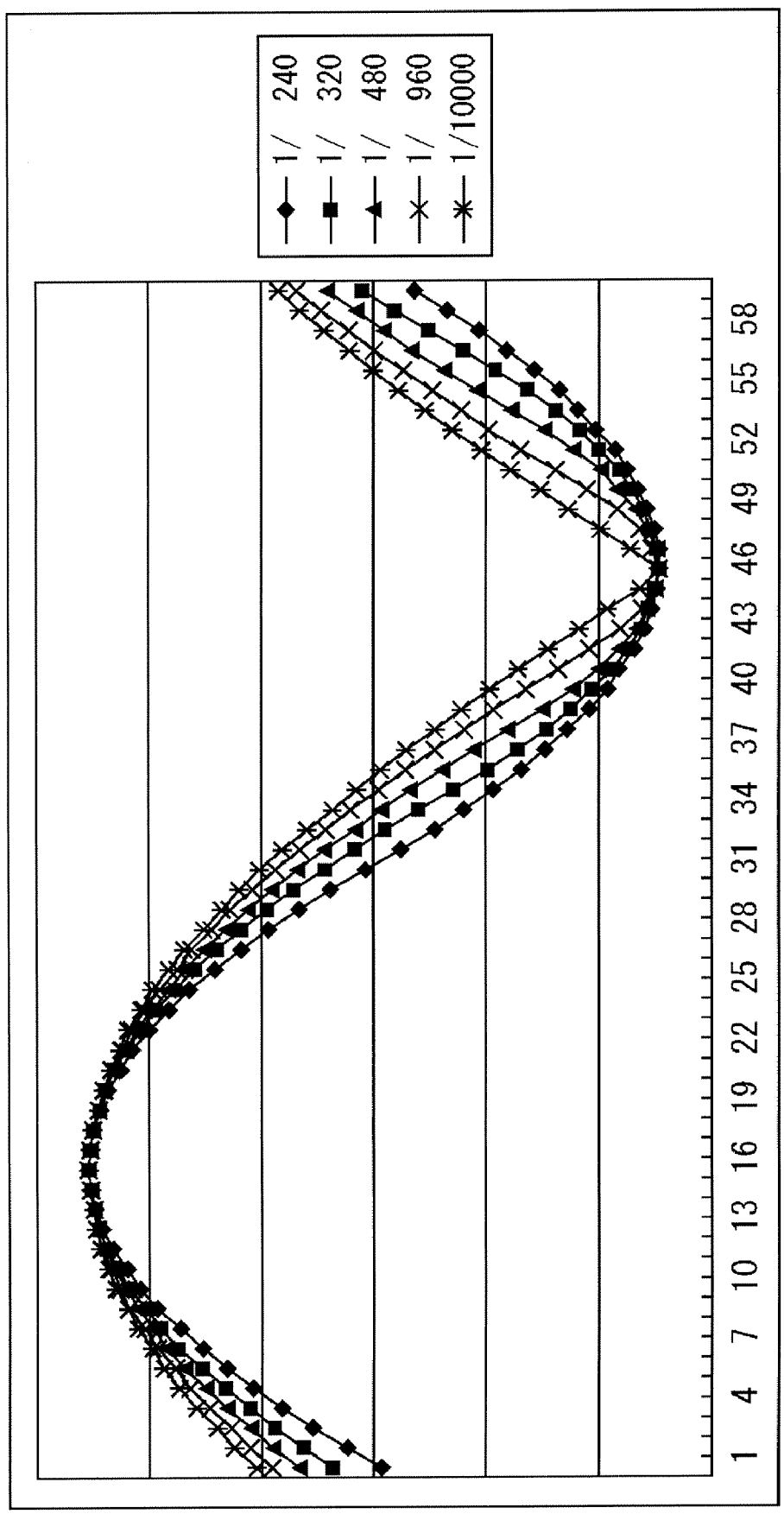
FIG. 13 illustrates a relationship between shutter speeds and flicker.

In step S28, the function selector 114 selects a function of a flicker waveform (hereinafter referred to as a flicker function) corresponding to a present shutter speed from among functions indicating flicker waveforms set for respective shutter speeds in the memory 114a, and supplies the selected function to the flicker correction value generator 113. The memory 114a stores flicker waveform functions set for respective shutter speeds, as shown in FIG. 13. FIG. 13, in which the horizontal axis indicates phase and the vertical axis indicates amplitude, shows an example of functions indicating waveforms corresponding to shutter speeds of 1/240 seconds, 1/320 seconds, 1/480 seconds, 1/960 seconds, and 1/1000 seconds. More specifically, a flicker function Fr(φ) is stored as a function expressed by the following expression Fr(φ)=A× t(θ−φ). Herein, A is a parameter of amplitude, θ is a parameter of phase, φ is a parameter corresponding to blocks Z1 to Zn, and t( ) is a function indicating a waveform according to a shutter speed shown in FIG. 13.

In step S29, the flicker correction value generator 113 substitutes parameters of phase and amplitude supplied from the phase-and-amplitude extractor 112 for the flicker function supplied from the function selector 114, so as to generate a logical flicker waveform function, obtain flicker values corresponding to respective blocks, store the values as flicker correction values in a table, and supply the correction values to the flicker correction value holder 104.

In step S30, the flicker correction value holder 104 holds the flicker correction values of the respective blocks supplied from the flicker correction value generator 113 in the table.

In step S31, the correcting unit 105 performs a correcting operation by reading correction values in units of blocks from the flicker correction value holder 104 for the respective pixel values stored in the buffer 101, reduces flicker components contained in the pixel values, and outputs the pixel values. The correcting operation is described below with reference to FIG. 14.

As described above, amplitude and phase are extracted from the waveform Fk similar to a flicker waveform calculated on the basis of an integration value of pixel values of blocks. Then, a flicker correction value is set by using a logical flicker function obtained by substituting the amplitude and phase for the function set for each shutter speed. Accordingly, an effect of flicker according to a shutter speed can be reduced.

Figure 14:
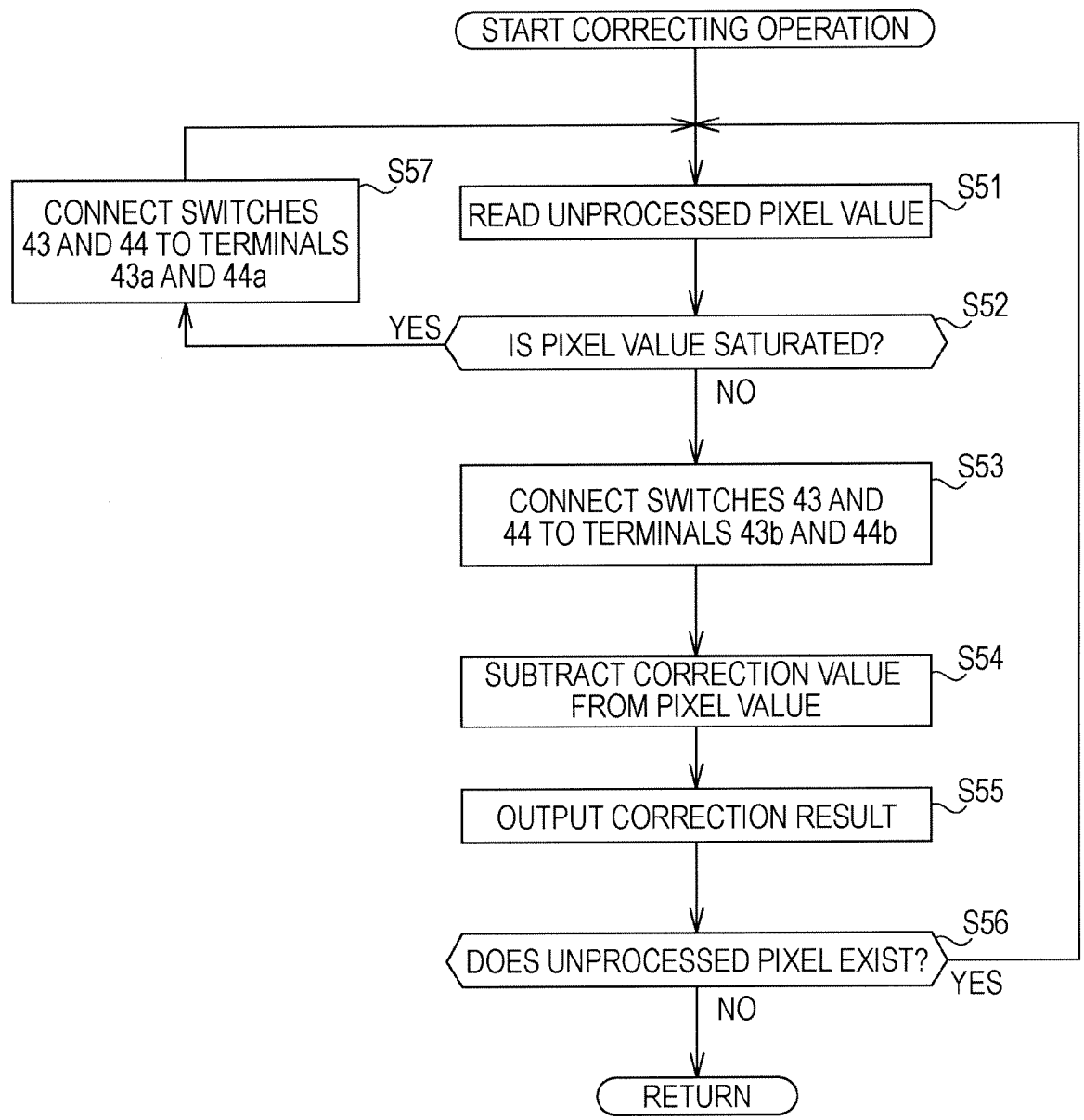
FIG. 14 is a flowchart illustrating a correcting operation.

Hereinafter, the correcting operation is described with reference to the flowchart shown in FIG. 14.

In step S51, the saturation level determining unit 141 reads a pixel value of an unprocessed pixel stored in the buffer 101.

In step S52, the saturation level determining unit 141 determines whether the pixel value is saturated, that is, whether the pixel value is a maximum pixel value. If it is determined in step S52 that the pixel value is saturated, that is, that the pixel value is a maximum pixel value, the process proceeds to step S57, where the switches 143 and 144 are controlled so as to be connected to the terminals 143a and 144a, respectively. Then, the process returns to step S51.

On the other hand, if it is determined in step S52 that the pixel value is not saturated, the process proceeds to step S53, where the saturation level determining unit 141 controls the switches 143 and 144 so as to be connected to the terminals 143b and 144b, respectively. Then, the process proceeds to step S54.

In step S54, the correcting operation unit 142 accesses the flicker correction value holder 104, reads a correction value corresponding to the block to which the pixel value supplied via the switch 143 belongs, and subtracts the correction value from the target pixel value so as to perform a correcting operation. That is, the correction value is the amplitude itself of the flicker component obtained on the basis of a flicker function, and thus the flicker component superimposed on the pixel value can be reduced by subtracting it.

In step S55, the correcting operation unit 142 outputs the corrected pixel value via the switch 144.

In step S56, the saturation level determining unit 141 determines whether an unprocessed pixel exists in the buffer 101. If an unprocessed pixel exists, the process returns to step S51 and the subsequent steps are repeated. Otherwise, the process ends.

In the above-described process, a pixel value may not properly be expressed if the pixel value is saturated. Therefore, a saturated pixel value is output without being corrected. If the pixel value is not saturated, a correction value as a theoretically-obtained flicker component itself is subtracted from the pixel value, so that an effect of flicker can be reduced.

In the above description, an example of using integration values of adjacent two fields has been described. Since the flicker period and imaging period are integral multiple, variation in phase in units of multiple of two fields is very small. Therefore, a flicker function is not always be set for each field, but a performance of correction is not damaged by an intermittent process of once every four fields. Therefore, the system controller 18 may operate at 60 Hz by holding integration values of two fields (or frames) and by performing a process once every four fields, so that the processing load of the system controller 18 can be reduced.

For example, when RGB signals are processed at the same time, three integrating units 102 and three integration value holders 103 may be required. However, the process need not be performed for every field for the above-described reason, and thus the scale of circuit can be reduced by processing the RGB signals by time division.

In the above description, the process is performed in units of fields, but the process may be performed in units of frames.

According to an embodiment of the present invention, in an imaging apparatus including an XY-address-scanning imaging device that performs imaging at a period of ½n (n is a natural number) of a light intensity fluctuation period of light, in an imaging method, and in a program, pixel values of pixels in each of a plurality of areas of an image are integrated; integration values are held; a waveform of a differential value between integration values of the same areas in two images having a phase difference of flicker of 180 degrees is operated; phase and amplitude of the flicker are extracted on the basis of the operated waveform of the differential value between the integration values; a waveform of the flicker is selected on the basis of shutter speed of the imaging apparatus; and the pixel values of the pixels are corrected by using a correction value based on the selected flicker waveform and the extracted phase and amplitude.

As a result, flicker can be reduced in a (high-speed imaging) camera that uses an XY-address-scanning imaging device and that performs imaging at half of the light intensity fluctuation period of light. Also, flicker can be appropriately reduced even if the shutter speed changes. Furthermore, flicker can be appropriately corrected even if the shutter speed is high. The processing load of the system controller 18 can be reduced and the circuit scale of the integrating unit can also be reduced.

The above-described series of processes can be executed by hardware or software. When the series of processes are executed by software, a program constituting the software is installed from a program recording medium to a computer incorporated in dedicated hardware or a multi-purpose personal computer capable of executing various functions by being installed with various programs.

Figure 15:
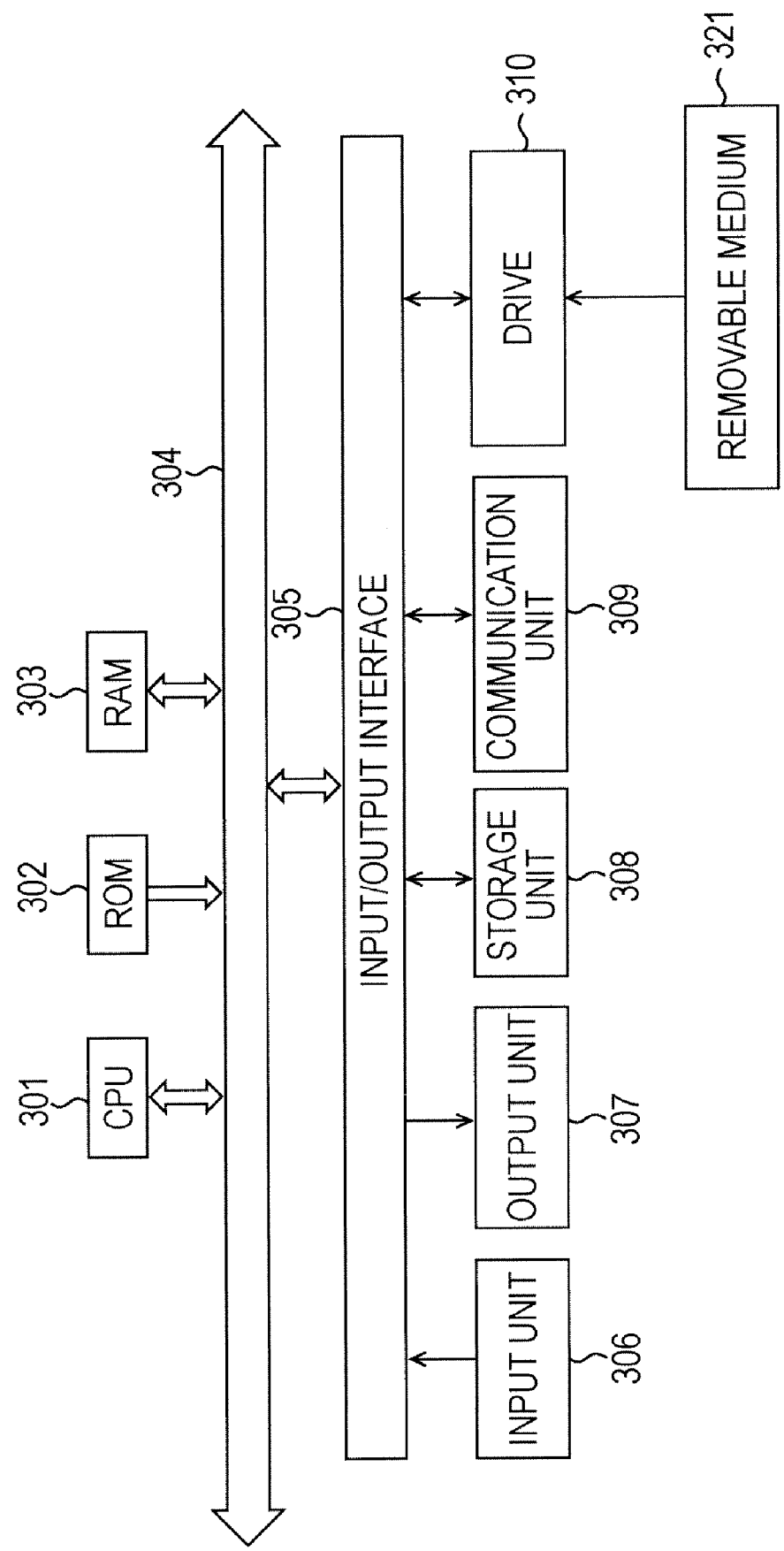
FIG. 15 illustrates a medium.

FIG. 15 shows a configuration of a personal computer in a case where an electrical internal configuration of the flicker reducing unit 21 shown in FIG. 1 is realized by software. In the personal computer, a CPU (central processing unit) 301 controls an entire operation of the personal computer. When receiving a command from a user via an input unit 306 including a keyboard and a mouse, an input/output interface 305, and a bus 304, the CPU 301 executes a program stored in a ROM (read only memory) 302 in response to the command. Also, the CPU 301 loads a program that is read from a removable medium 321 including a magnetic disk, an optical disc, a magneto-optical disc, or a semiconductor memory connected to a drive 310 and that is installed in a storage unit 308 to a RAM (random access memory) 303, and executes the program. Accordingly, the function of the above-described imaging apparatus 1 shown in FIG. 1 is realized by software. Furthermore, the CPU 301 controls a communication unit 309 to communicate with an external apparatus so as to transmit/receive data.

The program recording medium storing the program that is installed in the computer and that is brought into an executable state by the computer includes, as shown in FIG. 15, the removable medium 321 serving as a package medium including a magnetic disk (including a flexible disk); an optical disc (including a CD-ROM (compact disc read only memory); a DVD (digital versatile disc), and a magneto-optical disc); or a semiconductor memory, the ROM 302 temporarily or permanently stores the program, or a hard disk constituting the storage unit 308. The program is stored in the program recording medium via the communication unit 309 serving as an interface, such as a router and a modem, by using a wired or wireless communication medium, such as a local area network, the Internet, or digital satellite broadcast.

In this specification, steps describing the program stored in the program recording medium may be performed in time series in accordance with the described order. Alternatively, the steps may be performed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus including an XY-address-scanning imaging device that performs imaging at a period of ½ n of a light intensity fluctuation period of light, n being a natural number, the imaging apparatus comprising:

integrating means for integrating pixel values of pixels in each of a plurality of areas of an image;

holding means for holding integration values generated by the integrating means;

operating means for operating a waveform of a differential value between integration values of the same areas in two images having a phase difference of flicker of 180 degrees;

extracting means for extracting phase and amplitude of the flicker on the basis of the waveform of the differential value between the integration values operated by the operating means;

selecting means for selecting a waveform of the flicker on the basis of shutter speed of the imaging apparatus; and correcting means for correcting the pixel values of the pixels by using a correction value based on the flicker waveform selected by the selecting means and the phase and amplitude extracted by the extracting means.

2. The imaging apparatus according to claim 1, wherein the selecting means includes function storing means for storing a function to specify the flicker waveform by using the shutter speed as a parameter, and wherein the selecting means selects the flicker waveform from the function stored in the function storing means on the basis of the shutter speed of the imaging apparatus.

3. The imaging apparatus according to claim 1, wherein at least one of the integrating means, the holding means, the operating means, the extracting means, and the selecting means intermittently performs a process with respect to an imaging period.

4. The imaging apparatus according to claim 1, wherein at least one of the integrating means, the holding means, the operating means, the extracting means, and the selecting means performs a process for each color in a time division method.

5. An imaging method for an imaging apparatus including an XY-address-scanning imaging device that performs imaging at a period of ½ n of a light intensity fluctuation period of light, n being a natural number, the imaging method comprising:

integrating pixel values of pixels in each of a plurality of areas of an image;
   holding integration values generated in the integrating;
   operating a waveform of a differential value between integration values of the same areas in two images having a phase difference of flicker of 180 degrees;
   extracting phase and amplitude of the flicker on the basis of the waveform of the differential value between the integration values operated in the operating;
   selecting a waveform of the flicker on the basis of shutter speed of the imaging apparatus; and
   correcting the pixel values of the pixels by using a correction value based on the flicker waveform selected in the selecting and the phase and amplitude extracted in the extracting.

6. A recording medium storing a computer-readable program to control an imaging apparatus to perform a method, the imaging apparatus including an XY-address-scanning imaging device that performs imaging at a period of ½ n of a light intensity fluctuation period of light, n being a natural number, the method comprising:

integrating pixel values of pixels in each of a plurality of areas of an image;
   holding integration values generated in the integrating;
   operating a waveform of a differential value between integration values of the same areas in two images having a phase difference of flicker of 180 degrees;
   extracting phase and amplitude of the flicker on the basis of the waveform of the differential value between the integration values operated in the operating;
   selecting a waveform of the flicker on the basis of shutter speed of the imaging apparatus; and
   correcting the pixel values of the pixels by using a correction value based on the flicker waveform selected in the selecting and the phase and amplitude extracted in the extracting.

7. An imaging apparatus including an XY-address-scanning imaging device that performs imaging at a period of ½ n of a light intensity fluctuation period of light, n being a natural number, the imaging apparatus comprising:

an integrating unit configured to integrate pixel values of pixels in each of a plurality of areas of an image;
   a holding unit configured to hold integration values generated by the integrating unit;
   an operating unit configured to operate a waveform of a differential value between integration values of the same areas in two images having a phase difference of flicker of 180 degrees;
   an extracting unit configured to extract phase and amplitude of the flicker on the basis of the waveform of the differential value between the integration values operated by the operating unit;
   a selecting unit configured to select a waveform of the flicker on the basis of shutter speed of the imaging apparatus; and
   a correcting unit configured to correct the pixel values of the pixels by using a correction value based on the flicker waveform selected by the selecting unit and the phase and amplitude extracted by the extracting unit.

8. The imaging apparatus according to claim 7, wherein the selecting unit includes a function storing unit configured to store a function to specify the flicker waveform by using the shutter speed as a parameter, and wherein the selecting unit is configured to select the flicker waveform from the function stored in the function storing unit on the basis of the shutter speed of the imaging apparatus.

9. The imaging apparatus according to claim 7, wherein at least one of the integrating unit, the holding unit, the operating unit, the extracting unit, and the selecting unit intermittently performs a process with respect to an imaging period.

10. The imaging apparatus according to claim 7, wherein at least one of the integrating unit, the holding unit, the operating unit, the extracting unit, and the selecting unit performs a process for each color in a time division method.

* * * * *